United States Patent
Ema et al.

(10) Patent No.: US 9,108,855 B2
(45) Date of Patent: Aug. 18, 2015

(54) METHOD FOR PRODUCING PURIFIED ALKALI SILICATE AQUEOUS SOLUTION AND SILICA SOL

(75) Inventors: Kiyomi Ema, Tokyo (JP); Noriyuki Takakuma, Sodegaura (JP); Tohru Nishimura, Toyama (JP); Naoki Kawashita, Toyama (JP); Kouji Yamaguchi, Toyama (JP)

(73) Assignee: NISSAN CHEMICAL INDUSTRIES, LTD., Tokyo (JP)

(*) Notice: Subject to any disclaimer, the term of this patent is extended or adjusted under 35 U.S.C. 154(b) by 303 days.

(21) Appl. No.: 13/603,715

(22) Filed: Sep. 5, 2012

(65) Prior Publication Data

US 2013/0055646 A1   Mar. 7, 2013

Related U.S. Application Data

(60) Provisional application No. 61/676,665, filed on Jul. 27, 2012.

(30) Foreign Application Priority Data

Jul. 27, 2012   (JP) ................. 2011-192793

(51) Int. Cl.
| | |
|---|---|
| *B24D 3/00* | (2006.01) |
| *B24D 3/02* | (2006.01) |
| *B24D 11/00* | (2006.01) |
| *B24D 18/00* | (2006.01) |
| *C09K 3/14* | (2006.01) |
| *C09C 1/68* | (2006.01) |
| *C01B 33/148* | (2006.01) |
| *C01B 33/143* | (2006.01) |
| *B82Y 30/00* | (2011.01) |

(52) U.S. Cl.
CPC .......... *C01B 33/1485* (2013.01); *B82Y 30/00* (2013.01); *C01B 33/1435* (2013.01); *C01P 2004/64* (2013.01)

(58) Field of Classification Search
USPC ........................... 51/293, 307, 308
See application file for complete search history.

(56) References Cited

U.S. PATENT DOCUMENTS

| | | | | |
|---|---|---|---|---|
| 3,775,068 A | * | 11/1973 | Miller et al. ............... | 51/308 |
| 5,100,581 A | * | 3/1992 | Watanabe et al. .......... | 516/82 |
| 7,125,432 B2 | * | 10/2006 | Huang ........................ | 51/308 |
| 8,187,351 B2 | * | 5/2012 | Nakayama et al. ........ | 51/308 |
| 2014/0013674 A1 | * | 1/2014 | Nakayama et al. ........ | 51/308 |

FOREIGN PATENT DOCUMENTS

| | | |
|---|---|---|
| CN | 101077946 A | 11/2007 |
| JP | A-2001-294420 | 10/2001 |

OTHER PUBLICATIONS

Apr. 3, 2015 Office Action issued in Chinese Application No. 201280042909.2.

* cited by examiner

*Primary Examiner* — James McDonough
(74) *Attorney, Agent, or Firm* — Oliff PLC

(57) ABSTRACT

To provide a method for producing an alkali silicate aqueous solution containing a reduced amount of foreign substance of plate-like fine particles and a method for producing a silica sol containing a reduced amount of foreign substance of plate-like fine particles. A method for producing an alkali silicate aqueous solution fulfilling the following condition: the existing amount of plate-like fine particles having a length of one side of 0.2 to 4.0 μm and a thickness of 1 to 100 nm is determined to be 0 to 30%. The method for producing an alkali silicate aqueous solution includes the steps of adjusting a silica concentration of an alkali silicate aqueous solution to 0.5 to 10.0% by mass and filtering the alkali silicate aqueous solution through a filter having a removal rate of particles with a primary particle size of 1.0 μm of 50% or more.

6 Claims, No Drawings

METHOD FOR PRODUCING PURIFIED ALKALI SILICATE AQUEOUS SOLUTION AND SILICA SOL

TECHNICAL FIELD

The present invention relates to a method for producing a purified alkali silicate aqueous solution containing a reduced amount of foreign substance of plate-like fine particles and relates to a method for producing a silica sol using the purified alkali silicate aqueous solution containing a reduced amount of foreign substance of plate-like fine particles.

BACKGROUND ART

In recent years, in order to increase the recording density of magnetic disk memories, a magnetic head has had an extremely small float thickness of 10 nm or smaller. In the production process of a magnetic disk substrate, a surface polishing process is essential, and the surface polishing is carried out with, for example, an abrasive containing colloidal silica.

The abrasive is required to provide good surface smoothness (for example, surface roughness [Ra] and waviness [wa]) and not to cause surface defects such as scratches and pits.

Also in the semiconductor field, wirings have been made finer in highly integrated circuits and faster operating frequencies. In the production process of semiconductor devices, a pattern formation surface is also required to have further smoothness.

In a planarization process of these magnetic disk substrates and semiconductor substrates, subsequent to the polishing process with an abrasive containing colloidal silica, the colloidal silica as abrasive grains and fine particles are removed by washing.

For the washing, an aqueous solution of an acidic or alkaline chemical agent is used. Usable examples of the acidic chemical agent include a compound containing a fluorine ion, such as hydrofluoric acid, ammonium fluoride, ammonium hydrogen difluoride, and fluoroboric acid, sulfuric acid, nitric acid, hydrochloric acid, acetic acid, citric acid, malic acid, oxalic acid, and perchloric acid. Usable examples of the alkaline chemical agent include sodium hydroxide, potassium hydroxide, calcium hydroxide, ammonia, and amines. An aqueous solution of such an acidic or alkaline chemical agent may contain a surfactant such as a sodium alkylbenzene sulfonate, a polyoxyethylene alkyl ether sulfate, and a dioctyl sulfosuccinate; and a chelating agent such as sodium tripolyphosphate, sodium pyrophosphate, zeolite, and sodium ethylenediaminetetraacetate.

The colloidal silica used as the abrasive has a spherical shape or substantially a spherical shape, and thus can be removed by a related-art washing method. However, recently, it has been revealed that there are particles that cannot be easily removed by the related-art washing method.

As a method of obtaining an alkali silicate aqueous solution that is substantially free from particles having a particle size of 1 nm or more, a method in which an alkali silicate aqueous solution is previously adjusted to have a viscosity of 1 to 50 mPa·s and is passed through an ultrafiltration membrane having a molecular weight cut-off of 15,000 or less is disclosed (Patent Document 1).

RELATED ART DOCUMENTS

Patent Document

Patent Document 1: Japanese Patent Application Publication No. 2001-294420 (JP 2001-294420 A)

SUMMARY OF THE INVENTION

Problem to be Solved by the Invention

It has been ascertained that the particles that cannot be easily removed by related-art washing are plate-like fine particles having a length of one side of 0.2 to 4.0 μm and a thickness of 1 to 100 nm with observation by a scanning electron microscope. It has been revealed that the plate-like fine particles are derived from the silica sol used as a raw material of an abrasive.

In related art, an alkali silicate aqueous solution is obtained by heating and dissolving a raw material cullet, then immediately adding a filter aid such as diatomaceous earth directly to the crude alkali silicate aqueous solution, and filtering the mixture, thereby purifying the solution. However, the method cannot reduce the amount of plate-like fine particles having a length of one side of 0.2 to 4.0 μm and a thickness of 1 to 100 nm with observation by a scanning electron microscope.

By the method in Patent Document 1, the filtration rate of an alkali silicate aqueous solution is significantly low because a typical ultrafiltration membrane is considered to have a pore size of 0.01 μm or less. Hence, the method is unsuitable for mass production.

Therefore, an object of the present invention is to provide a method for producing a silica sol containing a reduced amount of plate-like fine particles having a length of one side of 0.2 to 4.0 μm and a thickness of 1 to 100 nm with observation by a scanning electron microscope. To address this, it is an object of the present invention to provide a method of reducing the amount of the plate-like fine particles in an alkali silicate aqueous solution that is a raw material of the silica sol.

Another object of the present invention is to provide a method for producing a silica sol that has a high filtration rate, can be mass-produced, and contains a reduced amount of the plate-like fine particles.

Means for Solving the problem

The inventors of the present invention have carried out intensive studies, and as result, have found a method of solving the problems by filtering an alkali silicate aqueous solution in a particular condition.

That is, a first aspect is a method for producing a purified alkali silicate aqueous solution fulfilling the following condition (1): (1) an existing amount of plate-like fine particles having a length of one side of 0.2 to 4.0 μm and a thickness of 1 to 100 nm is determined to be 0 to 30% in accordance with a measurement method A. The method for producing a purified alkali silicate aqueous solution is characterized by including the steps of: adjusting a silica concentration of an alkali silicate aqueous solution to 0.5 to 10.0% by mass, and filtering the alkali silicate aqueous solution through a filter having a removal rate of particles with a primary particle size of 1.0 μm of 50% or more. In the method for producing a purified alkali silicate aqueous solution, the measurement method A is a method in which 30 mL of an alkali silicate aqueous solution at 25° C. adjusted to have a silica concentration of 4% by mass is passed through a membrane type filter (filtration area: 4.90 cm$^2$) having an absolute pore size of 0.4 µm, then the membrane type filter is observed by a scanning electron microscope at a magnification of 5,000 times, presence of one or more of plate-like fine particles in one visual field of a 15-by-20 µm rectangle is regarded as one count, presence or absence of the count in each of 100 visual fields that are not overlapped with each other is determined, and the total number of the obtained counts is regarded as an existing amount (%) of the plate-like fine particles.

A second aspect is the method for producing a purified alkali silicate aqueous solution according to the first aspect, in which the removal rate is 60% or more.

A third aspect is the method for producing a purified alkali silicate aqueous solution according to the first aspect, in which the removal rate is 70% or more.

A fourth aspect is the method for producing a purified alkali silicate aqueous solution according to the first aspect, in which the removal rate is 80% or more.

A fifth aspect is the method for producing a purified alkali silicate aqueous solution according to the first aspect, in which the removal rate is 90% or more.

A sixth aspect is the method for producing a purified alkali silicate aqueous solution according to any one of the first aspect to the fifth aspect, in which the filter is at least one selected from the group consisting of a membrane type filter, a pleats type filter, a depth type filter, a yarn-wound type filter, a surface type filter, a roll type filter, a depth-pleats type filter, and a diatomaceous earth-containing type filter.

A seventh aspect is the method for producing a purified alkali silicate aqueous solution according to any one of the first aspect to the fifth aspect, in which the filter is a membrane type filter having an absolute pore size of 0.3 to 3.0 µm.

An eighth aspect is the method for producing a purified alkali silicate aqueous solution according to any one of the first aspect to the seventh aspect, in which the alkali component of the alkali silicate aqueous solution is at least one selected from the group consisting of a sodium ion, a potassium ion, a lithium ion, a rubidium ion, and a cesium ion.

A ninth aspect is a method for producing a silica sol fulfilling the following condition (2): (2) an existing amount of plate-like fine particles having a length of one side of 0.2 to 4.0 µm and a thickness of 1 to 100 nm is determined to be 0 to 30% in accordance with the measurement method A as described in the first aspect. The method for producing a silica sol is characterized by including: preparing an active silicic acid solution by subjecting the purified alkali silicate aqueous solution obtained in any one of the first aspect to the eighth aspect to cation-exchange, adding the active silicic acid solution into an alkaline aqueous solution to obtain a mixture, and heating the mixture to polymerize active silicic acid.

A tenth aspect is the production method according to the ninth aspect, in which the alkali component in the alkaline aqueous solution is at least one selected from the group consisting of an alkali metal ion, an ammonium ion, an amine compound, and a quaternary ammonium ion.

Effects of the Invention

The method for producing a purified alkali silicate aqueous solution of the present invention can efficiently removes plate-like fine particles that have a length of one side of 0.2 to 4.0 µm and a thickness of 1 to 100 nm and remain by related-art filtration of an alkali silicate aqueous solution. On this account, also in a silica sol produced using the purified alkali silicate aqueous solution obtained according to the present invention, the remaining amount of the plate-like fine particles is reduced comparing with a related-art silica sol.

When an abrasive using the silica sol containing a reduced amount of plate-like fine particles having a length of one side of 0.2 to 4.0 µm and a thickness of 1 to 100 nm with observation by a scanning electron microscope is used in a planarization process of a magnetic disk substrate or a semiconductor substrate, the plate-like fine particles do not remain or are unlikely to remain on the substrate after a washing process.

In addition, by the production method of the present invention, an alkali silicate aqueous solution has a high filtration rate, and therefore, the method is suitable for mass production of a purified alkali silicate aqueous solution and of a silica sol using the alkali silicate aqueous solution.

MODES FOR CARRYING OUT THE INVENTION

An alkali silicate aqueous solution used in the present invention has any $SiO_2/M_2O$ molar ratio (M is an alkali metal element), may be a commercially available alkali silicate aqueous solution, and typically has a $SiO_2/M_2O$ molar ratio of 2 to 4.

The alkali component of the alkali silicate aqueous solution is an alkali metal ion and is at least one selected from the group consisting of a sodium ion, a potassium ion, a lithium ion, a rubidium ion, and a cesium ion. Specifically, an alkali silicate aqueous solution containing a sodium ion, a potassium ion, or a lithium ion is commercially available and can be obtained at a low cost. A sodium silicate aqueous solution is most commonly used and is preferably used. A commercially available sodium silicate aqueous solution has a silica concentration of 19 to 38% by mass.

In a method for producing a purified alkali silicate aqueous solution in which an existing amount of plate-like fine particles having a length of one side of 0.2 to 4.0 µm and a thickness of 1 to 100 nm is determined to be 0 to 30% in accordance with a measurement method A, firstly, an alkali silicate aqueous solution is adjusted to have a silica concentration of 0.5 to 10.0% by mass with water. Then, a filter having a removal rate of particles with a primary particle size of 1.0 µm of 50% or more is prepared, and the alkali silicate aqueous solution having the adjusted concentration is filtered with the filter.

The filter used in the present invention has a removal rate of particles having a primary particle size of 1.0 µm of 50% or more. The removal rate is preferably 60% or more, more preferably 70% or more, even more preferably 80% or more, and most preferably 90% or more. Here, the removal rate of particles having a primary particle size of 1.0 µm or more is determined from the numbers of latex particles before and after the filtration of an aqueous dispersion liquid of monodisperse polystyrene latex particles having a diameter of 1.0 µm. Usable examples of the monodisperse polystyrene latex particles having a diameter of 1.0 µm include STANDEX-SC-103-S manufactured by JSR Corporation and Standard Particles 4009A manufactured by Thermo Fisher Scientific Inc.

The material of the filter used in the present invention is at least one selected from the group consisting of polyester, polyethylene, polypropylene, polycarbonate, polytetrafluoroethylene, polyethylene terephthalate, cellulose acetate, a cellulose/epoxy resin, a glass fiber/acrylic resin, cotton, polysulfone, nylon, and polyethersulfone. These materials may be used alone or in combination of them.

When such a material is used to produce a filter, a filter aid such as diatomaceous earth, silica/alumina, and a mixture of zeolite and silica/alumina may be woven into such a filter to be used.

The filter used in the present invention is classified into, based on the production method, a membrane type filter (porous membrane filter), a pleats type filter (pleated filter), a depth type filter (filter capturing solid particles not only on the surface of a filter material but also the inside of a filter material), a roll type filter (rolled-up filter), a yarn-wound type filter (filter in a spool shape), a surface type filter (filter capturing particulate substances mainly on a primary surface of the filter, not inside the filter), a diatomaceous earth-containing filter, and other filters. The production method of the filter used in the present invention is not particularly limited and any of the methods above may be adopted. Among them, the membrane type filter is effective for precision filtration. Specifically, a membrane filter having an absolute pore size of 0.3 to 3.0 μm can very effectively remove plate-like fine particles.

In order to increase the available time of such a filter, a filter having a removal rate of particles with a primary particle size of 1.0 μm of less than 50% may be used as a pretreatment filter, and then a filter having a removal rate of particles with a primary particle size of 1.0 μm of 50% or more may be used for filtration.

The filter having a removal rate of particles with a primary particle size of 1.0 μm of 50% or more is used to filter an alkali silicate aqueous solution at normal temperature. For the filtration of an alkali silicate aqueous solution having high viscosity, the temperature of the alkali silicate aqueous solution may be raised to a temperature at which the filtration performance of the filter is not impaired. The temperature of the alkali silicate aqueous solution is preferably 50° C. or less and more preferably 15° C. or more and 35° C. or less.

When the filter having a removal rate of particles with a primary particle size of 1.0 μm of 50% or more is used to filter an alkali silicate aqueous solution, the filtration rate varies depending on a silica concentration and a viscosity of the alkali silicate aqueous solution and on a filter used, but is 13 to 400 liter/min per square meter of filtration area of a filter used.

The measurement method A of plate-like fine particles contained in a purified alkali silicate aqueous solution that has been filtered through the filter having a removal rate of particles with a primary particle size of 1.0 μm of 50% or more is as follows.

[Measurement Method A]

30 ml of a solution to be observed that is adjusted to have a silica concentration of 4% by mass is passed at 25° C. through a polycarbonate membrane type filter (filtration area: 4.90 $cm^2$, diameter: 25 mm) having an absolute pore size of 0.4 μm. The membrane type filter that has passed is observed by a scanning electron microscope at a magnification of 5,000 times. The presence of one or more of plate-like fine particles having a length of one side of 0.2 to 4.0 μm and a thickness of 1 to 100 nm in one visual field of a 15-by-20 μm rectangle is regarded as one count. The presence or absence of the count in each of 100 visual fields that are not overlapped with each other is determined. The total number of the obtained counts is regarded as an existing amount (%) of the plate-like fine particles. Usable examples of the polycarbonate membrane type filter include Isopore HTTP-02500 manufactured by Nihon Millipore K.K.

In this case, the solution to be observed is a purified alkali silicate aqueous solution filtered through a filter having a removal rate of particles with a primary particle size of 1.0 μm of 50% or more.

An alkali silicate aqueous solution is filtered by the method of the present invention, thereby affording a purified alkali silicate aqueous solution in which the existing amount of plate-like fine particles having a length of one side of 0.2 to 4.0 μm and a thickness of 1 to 100 nm is determined to be 0 to 30% in accordance with the measurement method A.

The present invention is also a method for producing a silica sol fulfilling the following condition (1): (1) the existing amount of plate-like fine particles having a length of one side of 0.2 to 4.0 μm and a thickness of 1 to 100 nm is determined to be 0 to 30% in accordance with the measurement method A. The method is characterized by including preparing an active silicic acid solution by subjecting, to cation-exchange, the purified alkali silicate aqueous solution which is obtained by filtration through the filter having a removal rate of particles with a primary particle size of 1.0 μm of 50% or more and in which an existing amount of plate-like fine particles having a length of one side of 0.2 to 4.0 μm and a thickness of 1 to 100 nm is determined to be 0 to 30% in accordance with the measurement method A, and then polymerizing the active silicic acid in an alkaline aqueous solution.

In this case, a solution to be observed is the silica sol.

As the method of preparing an active silicic acid solution by subjecting the purified alkali silicate aqueous solution to cation-exchange, a related-art common method may be adopted. Examples of the method capable of being adopted include a method in which a cation exchange resin in the hydrogen form (for example, Amberlite (registered trademark) 120B: manufactured by Dow Chemical Company) is added into a purified alkali silicate aqueous solution having a silica concentration of 2 to 4% by mass and the cation exchange resin is removed when the aqueous solution obtains an acidic pH, preferably a pH of 2 to 4 and a method in which a cation exchange resin in the hydrogen form is filled in a column and a purified alkali silicate aqueous solution having a silica concentration of 2 to 4% by mass is passed through the column. The silica concentration of a purified alkali silicate aqueous solution to be ion-exchanged may be selected within a range from 0.1 to 10.0% by mass. In order to obtain an active silicic acid solution having good stability, the silica concentration is 0.1% by mass or more, preferably 2.0% by mass or more, and more preferably 3.0% by mass or more and is preferably 5.0% by mass or less.

The obtained active silicic acid solution is added into an alkaline aqueous solution, and then heated, thereby polymerizing the active silicic acid. The active silicic acid is polymerized to form colloidal silica particles, thereby affording a silica sol. The silica concentration of the active silicic acid solution to be added into an alkaline aqueous solution is in a range from 0.1 to 10.0% by mass, is 0.1% by mass or more, preferably 2.0% by mass or more, and more preferably 3.0% by mass or more, and is preferably 5.0% by mass or less.

The alkali component of the alkaline aqueous solution is at least one selected from the group consisting of an alkali metal ion, an ammonium ion, an amine compound, and a quaternary ammonium ion.

Examples of the alkali metal include a sodium ion, a potassium ion, a lithium ion, a rubidium ion, and a cesium ion, and a sodium ion and a potassium ion are preferred.

As the amine compound, a water-soluble amine compound is preferred. Examples of the amine compound include monoethanolamine, diethanolamine, triethanolamine, N,N-dimethylethanolamine, N-(β-aminomethyl)ethanolamine, N-methylethanolamine, monopropanolamine, and morpholine.

Examples of the quaternary ammonium ion include a tetraethanolammonium ion, a monomethyltriethanolammonium ion, and a tetramethylammonium ion.

An appropriate ratio of the active silicic acid solution to be added and the alkaline aqueous solution can be represented by the ratio of the number of moles of silica in the total amount of the active silicic acid solution to be added and the number of moles of an alkali component in the alkaline aqueous solution. The ratio of the number of moles of silica/the number of moles of an alkali component is preferably in a range from 25 to 100.

During the polymerization reaction of the active silicic acid, the temperature of an aqueous alkali solution can be selected within a range from 20 to 300° C. When the polymerization proceeds at a low temperature, the obtained colloidal silica particles have a small particle size. When the polymerization proceeds at a high temperature, the obtained colloidal silica particles have a large particle size. The obtained colloidal silica particles have varied particle size depending on a polymerization condition of the active silicic acid but the primary particle size with observation by a transmission electron microscope is in a range from 3 to 1,000 nm.

A diluted silica sol containing the colloidal silica particles obtained by the polymerization of the active silicic acid can be concentrated by a known method such as an evaporation-concentration method and an ultrafiltration method. The silica sol can be typically concentrated until the silica concentration reaches about 50% by mass.

EXAMPLES

Measurement Method of Removal Rate of Particles Having Primary Particle Size of 1.0 μm The removal rate of particles having a primary particle size of 1.0 μm of a filter to be used was determined by the following manner. An aqueous dispersion liquid in which 0.5 ml of monodisperse polystyrene latex particles (manufactured by JSR Corporation, STADEX SC-103-S) having a diameter of 1.0 μm was dispersed in 5,000 ml of pure water was prepared and (a) the number of particles having a primary particle size of 1.0 μm was counted using a Liquid-borne Particle Sensor KS-42C (manufactured by RION CO., LTD.). (b) The number of particles in the pure water used for the aqueous dispersion liquid was counted to be regarded as blank 1. The aqueous dispersion liquid was filtered with a filter to be used and (c) the number of particles having a primary particle size of 1.0 μm in the aqueous dispersion liquid after the filtration was counted. Pure water alone was filtered with a filter to be used in advance and (d) the number of particles in the filtered pure water was counted to be regarded as blank 2. The removal rate of particles having a primary particle size of 1.0 μm of a filter to be used was calculated in accordance with Equation (I).

Removal rate (%)=[1−{(c−d)/(a−b)}]×100

Example 1

To 1,000 g of a commercially available sodium silicate aqueous solution (JIS No. 3, $SiO_2$: 29.3% by mass, $Na_2O$: 9.5% by mass), 6,325 g of pure water was added, thereby diluting the solution. The diluted sodium silicate aqueous solution had physical properties of a $SiO_2$ concentration of 4.0% by mass, a $Na_2O$ concentration of 1.3% by mass, and a specific gravity of 1.038 and the existing amount of plate-like fine particles having a length of one side of 0.2 to 4.0 μm and a thickness of 1 to 100 nm with observation by a scanning electron microscope was 100% in accordance with the measurement condition A. The sodium silicate aqueous solution was filtered at a flow rate of 3 liter/min using a pleats type filter (PEH-005 manufactured by Roki Techno Co., Ltd.: the removal rate of particles having a primary particle size of 1.0 μm being 99.9%, the filtration area being 0.2 $m^2$, and the filter full-length being 250 mm) that was made of polypropylene nonwoven fabric mixed with fiberglass and diatomaceous earth and had a nominal pore size of 0.5 μm. The sodium silicate aqueous solution after the filtration was subjected to the measurement in accordance with the measurement method A, and as a result, the existing amount of the plate-like fine particles was 14%.

Example 2

The filtration of 7,325 g of the diluted sodium silicate aqueous solution having a $SiO_2$ concentration of 4.0% by mass was carried out in the same manner as in Example 1 except that as the filters used for filtration, a depth type filter (SL-005 manufactured by Roki Techno Co., Ltd: the removal rate of particles having a primary particle size of 1.0 μm being 90%, the filtration area being 0.3 $m^2$, and the filter full-length being 250 mm) that was made of polypropylene nonwoven fabric and had a nominal pore size of 0.5 μm was used as the first stage and a pleats type filter (PEH-005 manufactured by Roki Techno Co., Ltd.: the removal rate of particles having a primary particle size of 1.0 μm being 99.9%, the filtration area being 0.2 $m^2$, and the filter full-length being 250 mm) that was made of polypropylene nonwoven fabric mixed with fiberglass and diatomaceous earth and had a nominal pore size of 0.5 μm as the second stage was connected to the depth type filter in series, and the flow rate was 5 liter/min. The sodium silicate aqueous solution after the filtration was subjected to the measurement in accordance with the measurement method A, and as a result, the existing amount of the plate-like fine particles was 6%.

Example 3

To 1,000 g of a commercially available sodium silicate aqueous solution (JIS No. 3, $SiO_2$: 29.3% by mass, $Na_2O$: 9.5% by mass), 6,325 g of pure water was added, thereby diluting the solution. The diluted sodium silicate aqueous solution had physical properties of a $SiO_2$ concentration of 4.0% by mass, a $Na_2O$ concentration of 1.3% by mass, and a specific gravity of 1.038, and the existing amount of plate-like fine particles having a length of one side of 0.2 to 4.0 μm and a thickness of 1 to 100 nm with observation by a scanning electron microscope was 100% in accordance with the measurement condition A. The sodium silicate aqueous solution was filtered at a flow rate of 3 liter/min using a membrane type filter (CES-005 manufactured by Roki Techno Co., Ltd.: the removal rate of particles having a primary particle size of 1.0 μm being 100%, the filtration area being 0.75 $m^2$, and the filter full-length being 250 mm) that was made of polyethersulfone and had an absolute pore size of 0.45 μm. The sodium silicate aqueous solution after the filtration was subjected to the measurement in accordance with the measurement method A, and as a result, the existing amount of the plate-like fine particles was 4%.

Example 4

Through an ion exchange column filled with 500 mL of a cation exchange resin (Amberlite (registered trademark) 120B: manufactured by Dow Chemical Company), 4,000 g of the sodium silicate aqueous solution after the filtration obtained in Example 1 was passed at a rate of 2,500 g/hour to afford an active silicic acid solution. The obtained active silicic acid solution had a specific gravity of 1.019, a pH of 2.90, and a $SiO_2$ concentration of 3.55% by mass and was a clear and colorless liquid. Then, into a glass separable flask having a volume of 3 L, 4.55 g of 32% by mass of NaOH aqueous solution and 379 g of pure water were charged and the mixture was heated to 85° C. with stirring. To the heated NaOH aqueous solution, 723 g of the active silicic acid solution was added at a rate of 430 g/min, then the liquid temperature was raised to 100° C., and 1,879 g of the active silicic acid solution was further added. After the completion of addition, the stirring was continued for 6 hours while maintaining the liquid temperature at 100° C. After the completion of heating, the reaction mixture was cooled and was concentrated with an ultrafiltration membrane having a molecular weight cut-off of 50,000 to thereby afford a silica sol. The silica sol had physical properties of a specific gravity of 1.211, a pH of 9.9, a viscosity of 4.5, a silica concentration of 30.4% by weight, and a primary particle size of 10 to 40 nm with observation by a transmission electron microscope. The obtained silica sol was subjected to the measurement in accordance with the measurement method A, and as a result, the existing amount of the plate-like fine particles was 1%.

Comparative Example 1

To 1,000 g of a commercially available sodium silicate aqueous solution (JIS No. 3, $SiO_2$: 29.3% by mass, $Na_2O$: 9.5% by mass), 6,325 g of pure water was added, thereby diluting the solution. The diluted sodium silicate had physical properties of a $SiO_2$ concentration of 4.0% by mass, a $Na_2O$ concentration of 1.3% by mass, and a specific gravity of 1.038. Through an ion exchange column filled with 500 mL of a cation exchange resin (Amberlite (registered trademark) 120B, manufactured by Dow Chemical Company), 4,000 g of the obtained sodium silicate aqueous solution was passed at a rate of 2,500 g/hour to afford an active silicic acid solution. The obtained active silicic acid solution had a specific gravity of 1.020, a pH of 2.88, and a $SiO_2$ concentration of 3.55% by mass and was clear and colorless liquid. The existing amount of the plate-like fine particles in the active silicic acid solution was 100% determined in accordance with the measurement method A. A silica sol was produced by the method described in Example 4 except that the active silicic acid solution was used. The silica sol had physical properties of a specific gravity of 1.212, a pH of 9.9, a viscosity of 4.6, a silica concentration of 30.5% by weight, and a primary particle size of 10 to 40 nm with observation by a transmission electron microscope. The obtained silica sol was subjected to the measurement in accordance with the measurement method A, and as a result, the existing amount of the plate-like fine particles was 100%.

Comparative Example 2

To 1,000 g of a commercially available sodium silicate aqueous solution (JIS No. 3, $SiO_2$: 29.3% by mass, $Na_2O$: 9.5% by mass), 6,325 g of pure water was added, thereby diluting the solution. The diluted sodium silicate aqueous solution had physical properties of a $SiO_2$ concentration of 4.0% by mass, a $Na_2O$ concentration of 1.3% by mass, and a specific gravity of 1.038, and the existing amount of plate-like fine particles having a length of one side of 0.2 to 4.0 μm and a thickness of 1 to 100 nm with observation by a scanning electron microscope was 100% in accordance with the measurement condition A. The sodium silicate aqueous solution was filtered at a flow rate of 3 liter/min using a depth type filter (SL-200 manufactured by Roki Techno Co., Ltd.: the removal rate of particles having a primary particle size of 1.0 μm being 20%, the filtration area being 0.3 $m^2$, and the filter full-length being 250 mm) that was made of polypropylene nonwoven fabric and had a nominal pore size of 20 μm. The sodium silicate aqueous solution after the filtration was subjected to the measurement in accordance with the measurement method A, and as a result, the existing amount of the plate-like fine particles was 100%.

Comparative Example 3

A silica sol was obtained in the same manner as in Example 4 except that the sodium silicate aqueous solution after the filtration obtained in Comparative Example 2 was used. The silica sol had physical properties of a specific gravity of 1.214, a pH of 9.9, a viscosity of 5.0, a silica concentration of 30.7% by weight, and a primary particle size of 10 to 40 nm with observation by a transmission electron microscope. The obtained silica sol was subjected to the measurement in accordance with the measurement method A, and as a result, the existing amount of the plate-like fine particles was 100%.

Comparative Example 4

The alkali silicate aqueous solution prepared in the same production process as in Example 1 was filtered using a polysulfone ultrafiltration membrane (filtration area: 45 $cm^2$, diameter: 76 mm) having a molecular weight cut-off of 10,000. The average flow rate for 5 minutes from the start of the filtration was 1 liter/min per square meter of filtration area. The filtration rate after 100 minutes from the start of the filtration was lowered to 0.4 liter/min per square meter of filtration area.

INDUSTRIAL APPLICABILITY

The silica sol produced from the purified alkali silicate aqueous solution as a raw material obtained by the present invention contains plate-like fine particles in a small amount, whereby fine foreign substances do not remain in a surface treatment of a substrate such as metal, alloy, and glass. Therefore, such a sol can suppress defects such as defective wiring and uneven surface due to foreign substances and can be used for the production of a substrate having high surface precision.

The invention claimed is:

1. A method for producing a purified alkali silicate aqueous solution fulfilling the following condition:
    an existing amount of plate-like fine particles having a length of one side of 0.2 to 4.0 μm and a thickness of 1 to 100 nm is determined to be 0 to 30% in accordance with a measurement method A, the method for producing a purified alkali silicate aqueous solution comprising the steps of:
    adjusting a silica concentration of an alkali silicate aqueous solution to 0.5 to 10.0% by mass; and
    filtering the alkali silicate aqueous solution through a filter having a removal rate of particles with a primary particle size of 1.0 μm of 50% or more, wherein:
    the measurement method A is a method in which 30 mL of an alkali silicate aqueous solution at 25° C. adjusted to have a silica concentration of 4% by mass is passed through a membrane type filter (filtration area: 4.90 $cm^2$) having an absolute pore size of 0.4 pin, then the membrane type filter is observed by a scanning electron microscope at a magnification of 5,000 times, presence of one or more of plate-like fine particles in one visual field of a 15-by-20 μm rectangle is regarded as one count, presence or absence of the count in each of 100 visual fields that are not overlapped with each other is determined, and the total number of the obtained counts is regarded as an existing amount (%) of the plate-like fine particles, and the filter is a membrane type filter having an absolute pore size of 0.3 to 3.0 μm.

2. The method for producing a purified alkali silicate aqueous solution according to claim 1, wherein the removal rate is 60% or more.

3. The method for producing a purified alkali silicate aqueous solution according to claim 1, wherein the removal rate is 70% or more.

4. The method for producing a purified alkali silicate aqueous solution according to claim 1, wherein the removal rate is 80% or more.

5. The method for producing a purified alkali silicate aqueous solution according to claim 1, wherein the removal rate is 90% or more.

6. The method for producing a purified alkali silicate aqueous solution according to claim 1, wherein the alkali component of the alkali silicate aqueous solution is at least one selected from the group consisting of a sodium ion, a potassium ion, a lithium ion, a rubidium ion, and a cesium ion.

* * * * *